United States Patent [19]

Blount et al.

[11] Patent Number: 4,974,197
[45] Date of Patent: Nov. 27, 1990

[54] BATCHING DATA OBJECTS FOR RECORDING ON OPTICAL DISKS WITH MAXIMUM OBJECT COUNT

[75] Inventors: Michelle K. Blount; Connie M. Clark; Warren B. Harding; Horace T. S. Tang, all of Tucson, Ariz.

[73] Assignee: International Business Machines, Armonk, N.Y.

[21] Appl. No.: 464,684

[22] Filed: Jan. 16, 1990

Related U.S. Application Data

[63] Continuation of Ser. No. 190,612, May 5, 1988, abandoned.

[51] Int. Cl.$^5$ .................... G11C 13/00; G06F 13/00
[52] U.S. Cl. ......................... 364/900; 364/952.1
[58] Field of Search ... 364/200 MS File, 900 MS File

[56] References Cited

U.S. PATENT DOCUMENTS

| | | | |
|---|---|---|---|
| 4,489,378 | 12/1984 | Dixon et al. | 364/200 |
| 4,575,827 | 3/1986 | Kulakowski | 365/230 |
| 4,636,946 | 1/1987 | Hartung et al. | 364/200 |
| 4,754,399 | 6/1988 | Yamamoto et al. | 364/200 |
| 4,800,582 | 8/1986 | D'Agosto | 379/355 |
| 4,811,281 | 3/1989 | Okamoto et al. | 364/900 |

OTHER PUBLICATIONS

*IBM Technical Disclosure Bulletin*, vol. 26, No. 1, June 1983, "Batching Algorithm in Files and Hierarchic Data Bases", by G. M. Wilson, pp. 416–420.

U.S. Patent Application, S/N 030,393, filed 3/26/87 "Modular Data Storage Directories for Large-Capacity Data Storage Units", by W. J. Flannagan et al., Attorney DOcket TU985007.

*Primary Examiner*—Lawrence E. Anderson
*Attorney, Agent, or Firm*—Floyd E. Anderson

[57] ABSTRACT

Image data objects are accumulated in a relatively rapid access data buffer, such as a combination of main memory and a rapid access magnetic DASD. An optical disk recorder having a record medium with a plurality of addressable sectors each capable of storing a predetermined number of the VTOC entries receives the accumulated data objects along with the associated VTOC entries in a single access whenever the number of accumulated data objects is an inegral number of said predetermined number. A lower threshold for a minimal number of data bytes of the accumulated data objects may be required before such single access data recording operation is effected. An upper threshold of number of data bytes in the accumulated objects is also provided for causing the single access data transfer irrespective of the number of objects being an integral number of said predetermined number. The invention is advantageously practiced with a write-once, read-many record medium.

8 Claims, 3 Drawing Sheets

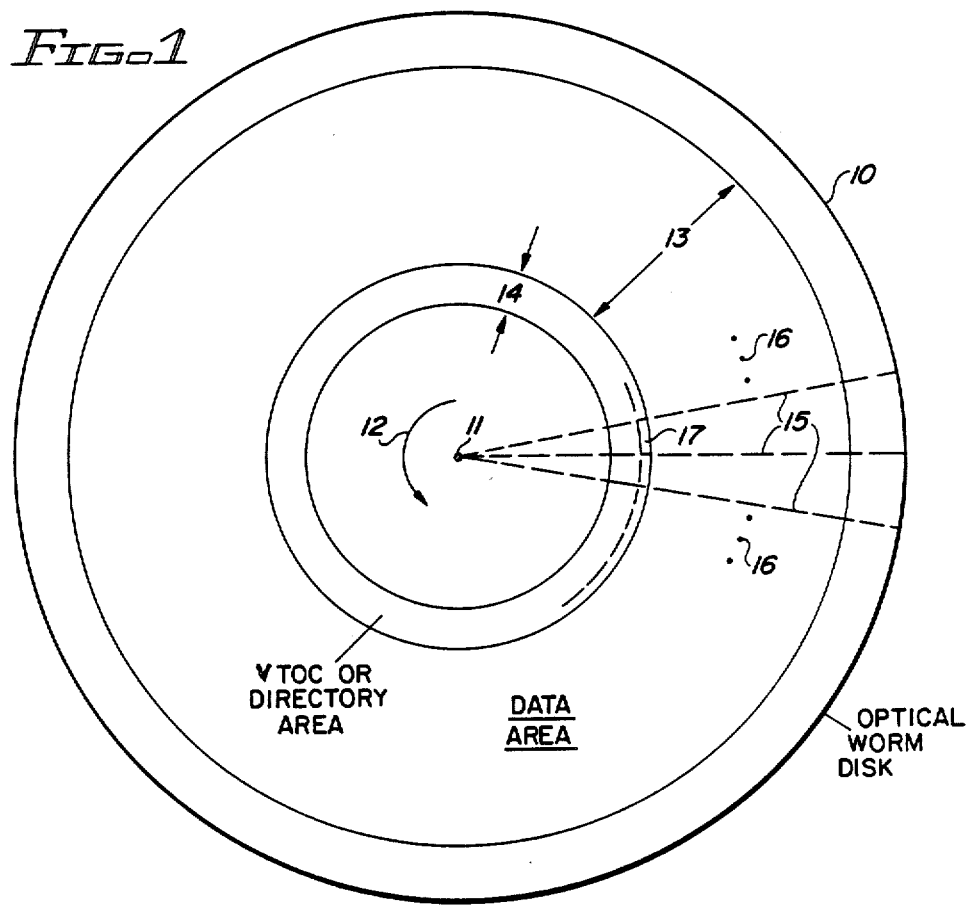
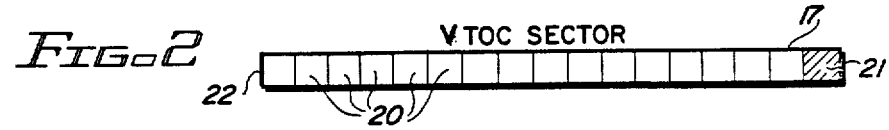
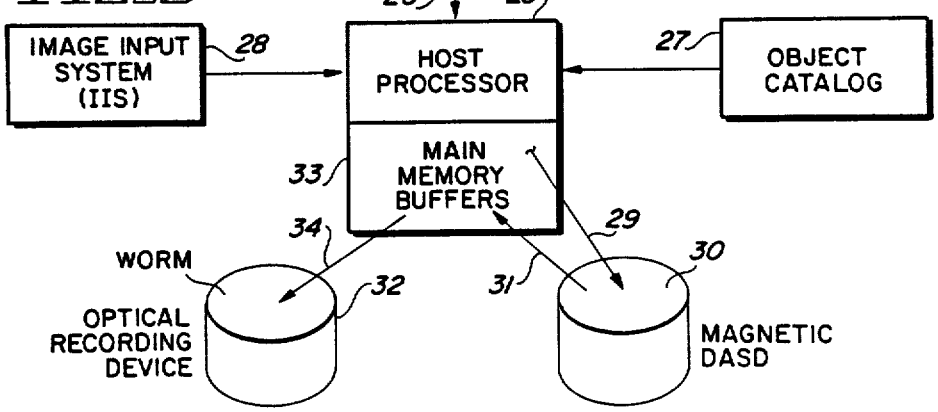

BATCHING DATA OBJECTS FOR RECORDING ON OPTICAL DISKS WITH MAXIMUM OBJECT COUNT

This application is a continuation of application Ser. No. 190,612, filed May 5, 1988, now abandoned.

FIELD OF THE INVENTION

The present invention relates to information handling systems employing data records retentively stored in record media, particularly those information handling systems which store image data objects on such record media.

DISCUSSION OF THE PRIOR ART

When a host processor accesses a peripheral data storage device, such as a magnetic tape unit, disk recorder (direct access storage device—DASD) or communications system, it is common practice to batch or group a plurality of data objects (records, data sets, etc.) for data transfer during each access to such peripheral data storage system. The reason for such grouping or batching is to increase efficiency of the information handling system to which the host processor and the peripheral devices belong. Each access to a peripheral device has associated control protocol steps which consume valuable computing time. By reducing the number of accesses, through increasing the amount of data transferred during each access, efficiency of the information handling systems is enhanced. Such grouping or batching has been selected based upon evaluating parameters associated with the data itself. For example, G. M. Wilson in the article "Batching Algorithm in Files and Hierarchic Data Bases", IBM TECHNICAL DISCLOSURE BULLETIN, Vol. 26, No. 1, June 1983, pp. 416–420 inclusive, teaches that whenever a single or common set of data is to be accessed by a plurality of users, then such data is batched or grouped together for enabling such shared accessing. In other systems, such as shown by Hartung et al., U.S. Pat. No. 4,636,946, the data grouping or batching was in accordance with a least-recently used (LRU) algorithm as it would destage or transfer data from a cache random-access memory to a DASD. Such grouping was based upon all of the data to be destaged which is storable in a single cylinder of the DASD. This selection of grouping is designed to enhance performance in that all of the tracks in a single cylinder of DASD can be electronically switched between the various recording heads of the cylinder without radially moving a headarm.

Dixon et al. in U.S. Pat. No. 4,489,378 group or batch read accesses to a DASD for promotion of data to cache or other buffer. Such grouping is based upon expected data usage of the data being read from the DASD by the host processor. Data adjacent the requested data but in addition to the requests are promoted from the DASD to the cache or other buffer.

The advent of write-once, read-many (WORM) record media creates a requirement for conservation of media; that is, since the media can only be written once, each addressable portion of that record media can only be used to record during a single recording operation. Accordingly, it is desired to store as much information in each of the addressable portions (in disk referred to as "sectors" or "blocks") as possible To this end, in co-pending, commonly-assigned patent application Flannagan et al., Ser. No. 030,393, filed Mar. 26, 1987, describes method and apparatus for creating a directory on a WORM medium. The directory is internally indexed to provide faster access to the data recorded on the medium. The procedure includes storing the data on the medium; for each data set being stored in the medium, recording in a directory portion of the medium a "segment" of directory information identifying the location of the data set on the medium, as well as the name of the data set and other parameters. The record medium used in connection with a disclosed embodiment of that application uses addressable sectors each capable of storing a fixed number of data bytes. The index of the directory permits a certain number of index entries for each addressable sector. When such a certain number of the segments were recorded, then one addressable area or sector of the record medium was recorded with directory index information. This technique conserves record media storage space by maximizing the use of the sectors for storage of directory index information. The segment recording was also adapted to maximize use of record media storage space within each addressable sector used for storing directory "segment" information. What is needed is a more efficient access and medium usage apparatus and methods for further enhancing usage of peripheral data storage.

SUMMARY OF THE INVENTION

It is an object of the present invention to provide for data recording operations which enhance the usage of write-once recording media as well as enhanced performance of an information handling system employing such record media.

In accordance with the invention, each record medium includes a table of contents, or directory, called a volume table of contents (VTOC). One VTOC entry describes and stores the disk address of one object stored in the disk. Each addressable sector of the record medium can contain up to a given number of such VTOC entries. A given number of data objects to be recorded on the record medium are collected into a group of objects such that a single access records the given number of record medium objects and the VTOC entries for such given number fill one addressable sector of the disk for maximizing usage of the sectors designated for storing control information.

A plurality of such groups of objects, each preferably having the given number of objects, may be recorded during each given access for enhancing the operation of the information handling system. For example, a minimal number of bytes of information may be required before an access to the record medium is permitted. Such minimal number of bytes of data may require a plurality of such control information storing sectors for storing integral multiples of said given number of VTOC entries during a single device access. This requirement fills a plurality of the VTOC sectors with VTOC entries. For limiting the buffering of data before recording on the record medium, an upper threshold or maximum number of bytes of data can be accumulated for recording on the record medium irrespective of whether or not an integral number of addressable sectors are used to store VTOC entries identifying the data to be recorded.

The foregoing and other objects, features, and advantages of the invention will be apparent from the following more particular description of preferred embodiments of the invention, as illustrated in the accompanying drawings.

BRIEF DESCRIPTION OF THE DRAWING

FIG. 1 is a diagrammatic showing of an optical disk of the write-once, read-many type with which the present invention is advantageously practiced.

FIG. 2 is a simplified diagrammatic showing of one addressable sector of the FIG. 1-illustrated disk used for storing a given number of VTOC entries.

FIG. 3 is a simplified block diagram of an information handling system in which the present invention may be advantageously practiced.

DETAILED DESCRIPTION OF THE PREFERRED EMBODIMENT

Figure 4:
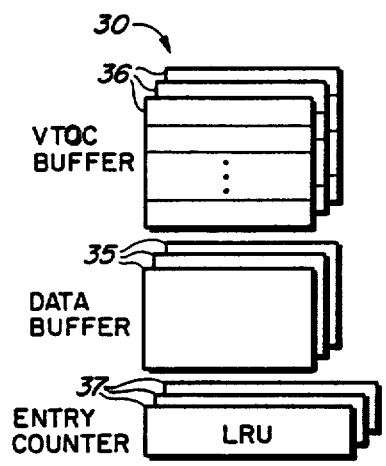
FIG. 4 conceptually illustrates buffer elements used in connection with a preferred embodiment of the present invention.

Referring now more particularly to the drawing, like numerals and figures denote like features and structural elements in the various diagrams. Write-once, read-many (WORM) optical record disk or medium 10 is of the ablative recording type. Disk 10 when supported in an optical recorder-player (not shown) is rotated about axis 11 of the disk in the direction of arrow 12. A first radial portion 13 is logically reserved for receiving and recording data objects, preferably of the image data type. Radial portion 14 is logically reserved for recording a volume table of contents (VTOC) which, in a preferred form, is a simple directory structure. Embossed or otherwise permanently inserted into the recording surface of disk 10 are a plurality of radially-extending lines 15 which denote the circumferential boundaries of addressable recording sectors, blocks or areas of disk 10. Each of the lines 15, which are equally angularly spaced apart, may include a recorded radial address of the immediately-following sector (track address), as well as the circumferential or angular position of the following sector, i.e., sector number. Ellipsis 16 indicate that angularly, equally-spaced sector lines 15 are disposed entirely around the disk 10 in the areas 13 and 14. A usual radial index mark may be provided, as is well known. Data objects are recorded in area 13 along the various concentric tracks of sectors or in a single spiral track of sectors disposed in such area using allocation techniques which are well known. In a similar manner, the addressable sectors within directory area 14 receive and store VTOC entries which identify and locate the data stored on disk 10. It is desired to maximize the number of VTOC entries in each of the addressable sectors in area 14, such as in addressable sector 17, which is shown in FIG. 2. Within sector 17, a plurality of VTOC entries, one entry per data object recorded in radial area 13 are represented by boxes 20. Each entry is but a small portion of the total capacity of an addressable sector 17. Even with a given number of VTOC entries 20 recorded in a single sector 17, a padding area 21 not containing any data may be required. In an early constructed embodiment of the invention, padding area 21 was eliminated. A sector header 22 and twelve VTOC entries filled a sector 17 having a 1024-byte capacity. Each header 22 included a block or sector identification and the number of VTOC entries (from 1 to 12) in the sector. Each VTOC entry consumed 80 bytes for identifying the name of the stored data object, its length, the sector of disk 10, which is the lowest sector number storing the data object (where its recording begins), the number of blocks (sectors) occupied by the data object, and date and time of recording. Other control information may also be included, as may be desired.

It is always desired to eliminate or reduce the padding area 21 of the VTOC area. For example, if three VTOC entries 20 were recorded in a single VTOC sector, then the padding area would comprise a major portion of the sector thereby wasting space within directory area 14 of disk 10. For space conservation or usage, please consider recording data objects, each consisting of 4K (4096) data bytes and one VTOC entry recorded in one VTOC sector. Each data object then actually requires 5K (5120) bytes of disk 10 storage capacity The sole VTOC entry is 20% of the total disk space used. If 12 VTOC entries are recorded in a single addressable VTOC sector, such as sector 17, the VTOC overhead of the disk 10 storage space for VTOC entries is reduced from 20% to about 2%. When data objects have a size of 100K bytes, the disk 10 space required for a single VTOC entry per VTOC sector is reduced from 20% for the 4K byte data objects to 1% of space utilization for each stored 100K byte data object. When storing 12 VTOC entries per directory sector 17 for the 100K byte data objects, the VTOC entry overhead is reduced to less than 0.1% of storage space required for each 100K byte data object.

The data transfer rate for optical disks is often substantially less than the data transfer rates for magnetic DASD. Accordingly, in an information handling system, magnetic DASD are considered as fast access devices while optical disk recorders are regarded as slow access recorders. For purposes of simplifying control, the directory area 14 is a separate radial portion on the disk 10 from the data recording portion. Each access to the directory portion 14 requires a separate radial seek of the headarm (not shown) which introduces headarm delays and intervening latency delays of disk 10 rotation for access to addressed ones of the disk 10 sectors. In certain low performance optical recorders, recording a single data object and recording a single VTOC entry with average seek and disk rotation times of 125 milliseconds results in about one-half second for recording one data object and one VTOC entry. The actual writing time for a 4K object and a single VTOC entry is then about 16 milliseconds for the data and 504 milliseconds for the VTOC entry for a total of 520 milliseconds. Most of the time is required for writing the VTOC entry (headarm movement causes the extra access time) reducing the effective data rate to an unacceptable low rate. Grouping or batching twelve objects for allowing twelve VTOC entries to be recorded in an addressable directory sector 17 results in recording 48K bytes of data in 192 milliseconds plus 520 milliseconds for recording all twelve of the VTOC entries. The total elapsed time is then 696 milliseconds for the twelve objects. This change results in a lower percentage of the total time for recording to record the control information in VTOC entries while increasing the effective data rate for recording data objects. The effective data rate increases further when the number of data objects chained together is increased in each access to disk 10. Accordingly, grouping data objects as an integer multiple number of VTOC entries storable in a directory sector not only conserves record media 10 storage space but also enhances the performance of the information handling system in which disk 10 is employed. Referring now more particularly to FIG. 3, host processor 25 of the information handling system is assigned to process the image data objects to be stored on disk 10. Doubleheaded arrow 26 indicates that host processor 25 may be operatively connected to other host processors (not shown) or other information handling systems, as is known. An object catalog 27 is employed in the information handling system in a usual manner. The catalog 27, as usual, is stored on fast accessing magnetic DASD (not shown). Catalog 27, a system wide directory of data objects, provides access to data objects recorded or otherwise being manipulated in the FIG. 3 information handling system. Catalog 27 includes identifications, status and locations of all the data objects. It also indicates when a plurality of copies of a data object are stored in various locations in the system.

Image data objects to be recorded are received from image input system IIS 28 which are supplied to host processor 25 for processing. IIS 28 may include a document sensor or reader (not shown) for converting document recorded data into electronic image data objects, as is known. The image data objects supplied to host processor 25 are stored, as indicated by arrow 29, onto fast access magnetic DASD 30. DASD 30 may be shared among a plurality of host processors (not shown) for manipulating the received image data objects. While host processor 25 is processing data objects, it keeps track of the accumulated image data objects and their associated control information in its own internal control structures. Additionally, host processor 25 periodically updates catalog 27 for indicating to all host processors and users of the information handling systems, the image data objects stored in magnetic DASD 30. DASD 30 stores the received data objects at least until host processor 25 schedules the DASD-stored data objects for recording onto the optical write-once, read-many (WORM) disk 10. DASD 30 may retain a copy of the data objects after disk 10 receives and stores its copy of the data objects.

Host processor 25 prepares a list of the DASD 30 stored data objects to be copied (indicated by arrows 31 and 34) from DASD 30 to optical recording device 32. While building chains of data objects to be stored on disk 10, host processor 25 stages DASD 30 stored data objects into the chains being built in its main memory data buffers 33. When host processor 25 determines that an integral number of data objects, having a total data byte capacity of a given range, are being stored in data buffers 33, then host processor 25 activates the optical WORM recording device 32, which contains a record disk 10, for receiving the chained data objects and their associated control (VTOC) information. This action is indicated by arrow 34 extending from data buffers 33 to device 32. In a constructed embodiment, device 32 consists of a random-access optical disk library (not shown) mechanism having a plurality of recording devices. The library portion has a open-sided storage wall storing a plurality of disks 10, one disk in each storage cell of the wall. A transfer device moves the disks between the cells and the recording devices all under host processor 25 control. Such media library operations are well known.

Referring now to FIG. 4, the conceptual image data buffer structure in buffers 33 (in host processor main storage) is illustrated. The various image data objects are stored in data buffer portions 35 while the control information is stored in VTOC buffer portions 36. The number of data objects and their respective sizes (if different) are stored in suitable counters 37. Data structures for such buffering and counting are shown in FIG. 7. FIG. 4 illustrates three groups of data buffers, three groups of VTOC buffers and three groups of entry counters 35-37. Each of the three groups store different types of image data objects; that is, the image data processing is effectively interleaved or multitasked in the information handling system. One type of image data objects can be bank checks, a second can be letters and memos, a third can be contracts, etc. All three types could be intermingled on disk 10 or recorded on separate disks. The rest of the discussion is directed toward but one of the three types of image data objects. It will be assumed that each image data object has a variable number of bytes of data with each data object representing a single document, such as a negotiable instrument, timecard, or the like. The VTOC buffer 36 has a plurality of entries, each entry being represented by the unnumbered rectangular boxes within the VTOC buffer. The format of the information stored in the VTOC buffer may be different from that stored on disk 10. Conversion of formats is in accordance with normal formatting procedures. Counter 37 counts the number of data objects stored in data buffer 35. If all data objects have the same size, counter 37 only counts the number of objects, the total bytes being easily determined from the object count. It is the usual situation to encounter variably-sized data objects. When such variable-sized objects are being stored in a data buffer 35, then counter 37 not only includes the object count but the byte count for each data object and the cumulative total of byte counts for all of the objects. Since host processor 25 may perform information handling operations on the data objects, a least-recently used (LRU) data castout or destaging system may be employed within counter 37. Further, an age floor may be required before any data object is transferred to the optical disk 10. That is, DASD 30 must have stored a given object for so many minutes, hours or days before it is eligible for storage on an optical disk 10. Additionally, the well-known, least-recently used (LRU) criteria may be employed for establishing when the data is to be recorded on the optical disk. In the preferred illustrative embodiment, the transfer of objects from magnetic DASD 30 to optical disk 10 is in accordance with the FIG. 6-illustrated automatic machine operations.

Figure 6:
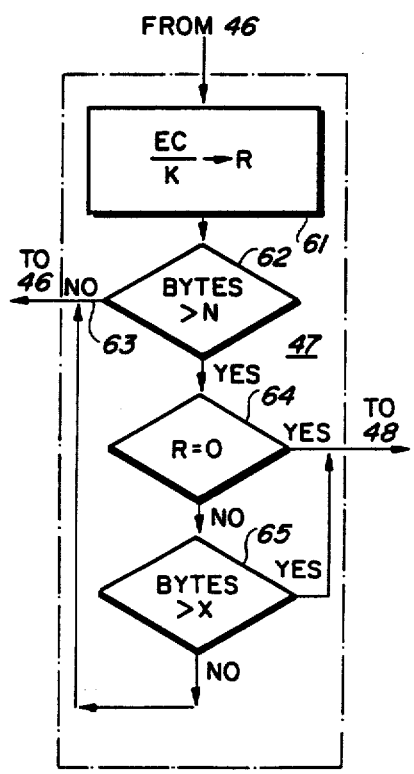
FIG. 6 is a second simplified flowchart of automatic machine operations for practicing the present invention in its preferred mode of operations.
Figure 5:
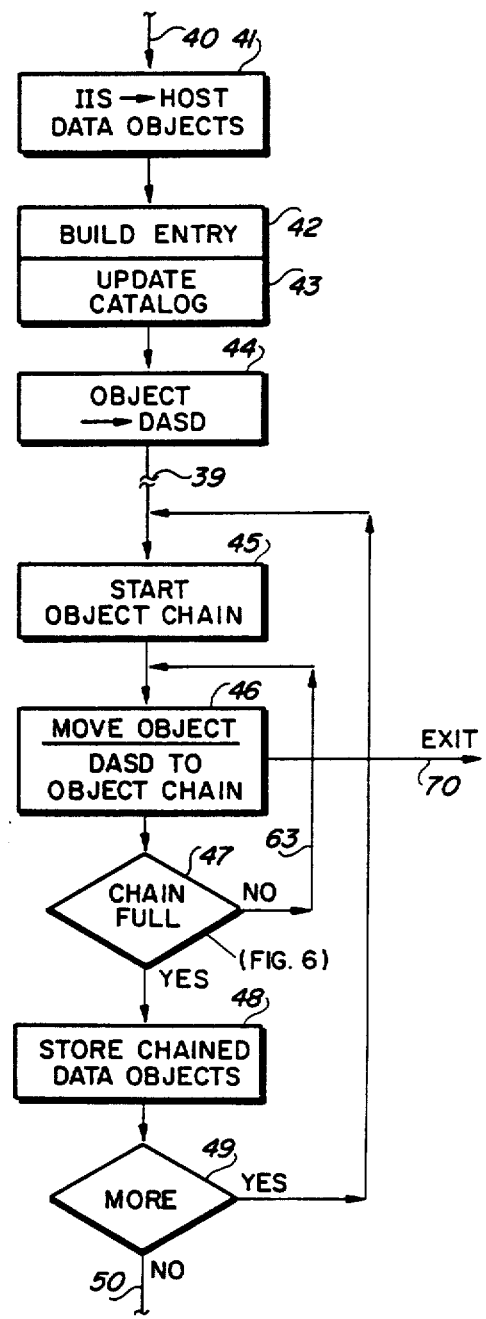
FIG. 5 is a simplified overall flowchart showing a set of automatic machine operations for implementing the present invention.
Figure 7:
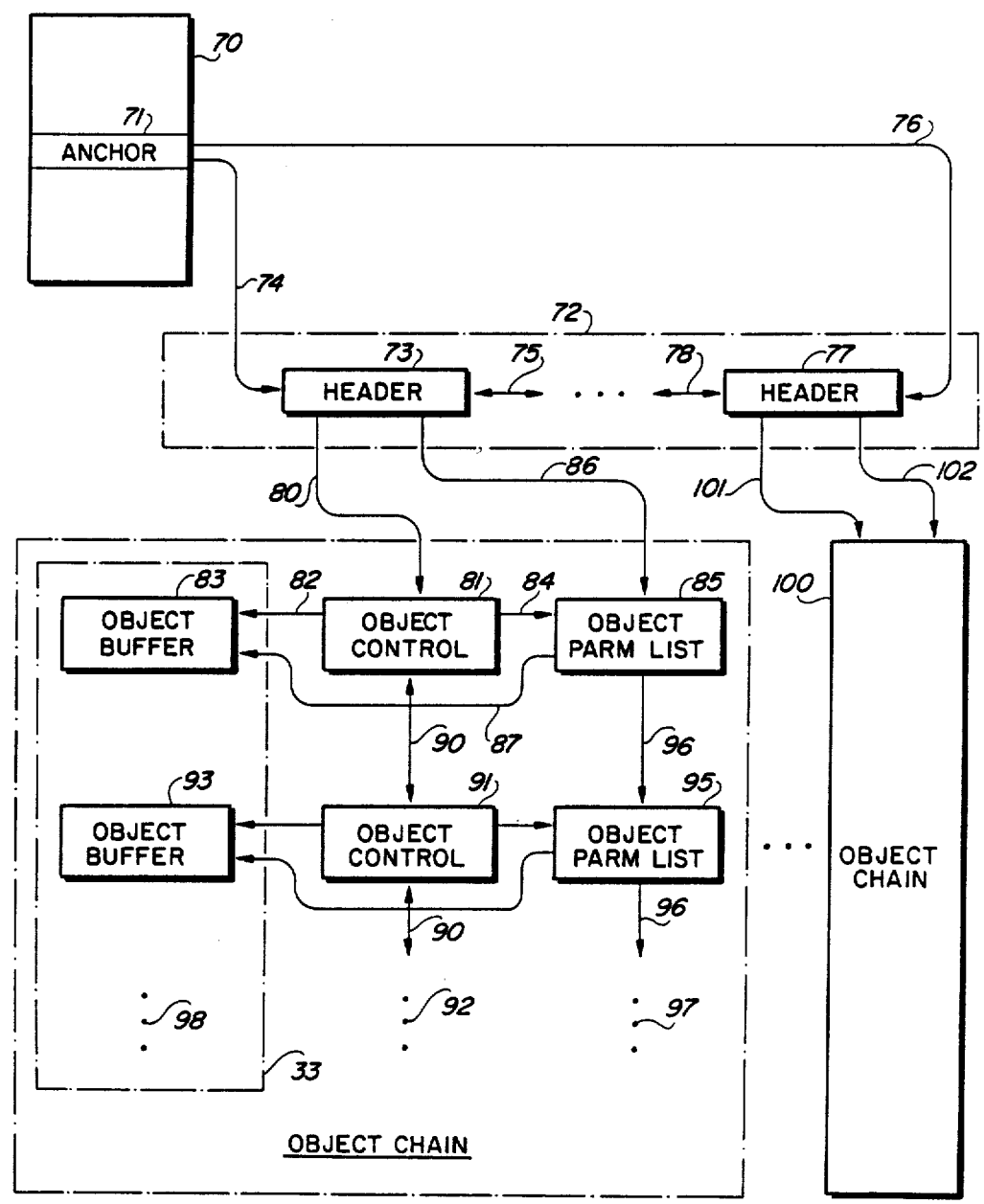
FIG. 7 diagrammatically illustrates chaining buffered objects to-be-stored in the FIG. 1-illustrated optical disk.

FIGS. 5 and 6 are simplified machine operation charts which show the sequence of machine operations for storing the image data objects onto disk 10 received from IIS 28. The machine operations are preferably effected through program means constructed as indicated by the machine operation charts. It is to be appreciated that host processor 25 interleaves the described machine operations with other operations beyond the scope of the present description. In any event, at line 40, the machine operations of host processor 25 begin. At step 41, image data objects are received by host processor 25 from IIS 28. Such transfers may be controlled by external interrupt supplied by IIS 28 to host processor 25. At step 42, host processor 25 builds a catalog 27 entry for each received data object, which includes the name of the data object (which may be a sequence number of scanning of the documents being processed in IIS 28). At this time, host processor 25 in step 43 updates catalog 27 using known techniques. Following catalog 27 updating, various other data processing operations (not shown) may be performed. At this time, the received data object may reside only in host processor 25. At step 44, host processor 25 records the data object received from IIS 28 on DASD 30. Following storing the image data object and any associated control information in DASD 30, additional data processing or information handling operations 39 occur. Such data processing operations include receiving additional image data objects, fetching data objects stored in one or more disks 10, etc. Host processor 25 starts an object chain in buffers 33 at step 45. If a chain header already exists, a partially completed chain also exists, as will become apparent. In this latter instance, the existing partially-completed chain is completed before a second chain is started. Such chaining structure is shown in FIG. 7 and is later described. At step 46, one data object is copied from DASD 30 to the chain being constructed. Included in this machine operation step is updating the data object count and totalling the number of bytes in the chain so far. FIG. 7 shows the data structure used for such counting. Then host processor 25 at step 47 determines the number of data objects currently in the chain being built and whether or not the number of data objects in the chain is an integral multiple of the number of VTOC entries storable in a single addressable sector of disk 10. If the criteria for transferring the data objects from DASD 30 to disk 10 are not met, then host processor 25 transfers another data object from DASD 30 to the chain being built. If all data objects have been copied from DASD 30, host processor 25 then stops building the chain as indicated by exit arrow 66 to perform other machine operations including receiving more data objects, etc. Whenever criteria are met for transferring the chain of data objects to disk 10, then host processor 25 at step 48 stores the chained data objects on disk 10. This recording operation preferably proceeds independently of building chains of data objects; the known recording operation by a usual recording program is initiated from the illustrated sequence of machine operations. The parameters for recording chained data objects on disk 10 in device 32 are set up using known device selection methods. As a part of the disk 10 recording operations, the VTOC entries for the respective chained data objects are created in a known manner and recorded into a next VTOC sector of disk 10. At step 49, host processor 25 ascertains if additional data objects stored in DASD 30 are to be copied to disk 10. If there are more data objects to be copied, machine steps 45-48 are repeated, otherwise host processor 25 proceeds to other operations (exit) at line 50. Upon completion of the data recording of each chain, the catalog 27 is updated to reflect the data transfers and recording. The recorded chain of data objects is erased from buffers 33.

FIG. 6 shows a preferred simplified set of machine operations for actually performing the criteria determination of step 47 for the chained data objects to be copied to disk 10. Entry into the FIG. 6-illustrated automatic machine operations is from step 46 of FIG. 5. In step 61, host processor 25 divides the data object count EC of the number of data objects currently in the chain being built of its copy of the counter 37 by K, where K is the number of VTOC entries storable in a single disk 10 sector. Host processor 25 then determines the remainder R of that division step and stores it in a work area (not shown). At step 62, host processor 25 compares the number of bytes currently stored in data buffer 35 which are in the chain with a number N. The number N is a minimum threshold of data bytes in the chained objects to be transferred to disk 10 during a single disk 10 access. If the minimum threshold for data recording on disk 10 is not met, then host processor 25 returns to step 46 via path 63 to copy another data object to the chain. On the other hand, if the minimum data transfer byte count is exceeded, then at step 64, host processor 25 determines whether the remainder R from the division of step 61 is equal to zero. If R equals zero, then a data recording operation on disk 10 is initiated at step 48 (FIG. 5). On the other hand, if the remainder is non-zero at step 64, host processor 25 at step 65 determines whether or not the number of bytes currently in the chain being built is greater than an upper threshold X. Upper threshold X may be an order of magnitude greater than the minimum threshold N. If the number of data bytes in the chained objects is greater than X, then a recording operation on disk 10 is initiated at step 48 even though one of the VTOC sectors will not be completely filled with VTOC entries. On the other hand, whenever the number of data bytes accumulated in the chain being built is not greater than X, then the host processor 25 returns to step 46 for copying another data object from DASD 30 to the chain being built. In each recording operation for disk 10, the number of chained objects is usually an integral multiple of the value K. A requirement to record large-byte count data objects requires the upper threshold to ensure the capacity of buffers 33 is not exceeded.

Referring now more particularly to FIG. 7, the setup and control object for data buffers 33 within a main memory of host processor 25 is described. All programming employs control blocks of all types to manage the program execution sequences. Such approach to program management is well known. Only those control structures of host processor 25 that directly relate to and control the transfer of information within buffers 33 for the purpose of batching data objects being stored onto optical device 32 are described. A control task control block 70 controls the writing of information, such as data objects, to optical device 32. Anchor entry 71 anchors the write request (one chain of data objects) into control block 70. The write requests or series of chains constitute a doubly-linked list of write request headers. Header 73 is the first header of a doubly-linked list and is pointed to by a headlist pointer (not shown) of anchor 71, as indicated by arrow 74. Header 73 is the first header built by host processor 25 at step 45. Double-headed arrows 75 and 78 with the intervening ellipses represent the middle write request headers of doubly-linked list 72. The trailing or last write request header 77 is pointed to by the trailing pointer (not shown) of entry 71, which points to the location in main memory of the trailing header as indicated by arrow 76. The headers within doubly-linked list 72 include pointers to later-described, linked-control lists used in connection with controlling the data object buffers within buffer 33, destination address of device 32, identification of a task of host processor 25, serial number of the write request of a task or other control information as usually found in write requests in data processing environments. Each of the headers of doubly-linked list 72 includes two pointers. The control structure headed by header 73 is described in detail, it being understood that the other control structures can be identical. Arrow 80 extending from header 73 represents a first address pointer of header 73 pointing to a doubly-linked list of object control blocks 81, 91, and 92. Double-headed arrows 90 represent the double linking of this linked list. Each of the data object control blocks are best described as a process control block which identifies the location of the object buffers 83, 93, 98, and the name of the contained data object(s), the size of the buffer (data links) and other information usually associated with managing buffers within a host processor main memory.

A second pointer of each of the headers in list 72, such as the second pointer of header 73 represented by arrow 86, points to a set of singly-linked data object parameters (PARM) lists 85, 95 . . . (PARM) list. The first object parameter list 85 is also pointed to by an address field within object control block 81 as indicated by arrow 84. Object parameter list 85 also includes a pointer which points to the data buffer 83 as indicated by arrow 87. List 85 also includes a pointer as indicated by arrow 96 pointing to the next item on the singly-linked list such as OPL (object parameter list) 95. In the same manner, OPL 95 includes a pointer, as also indicated by an arrow 96, pointing to other OPL as indicated by ellipses 97. The doubly-linked list of object control blocks and a singly-linked list of object parameter lists comprise a single write request or chain to write data objects stored within buffers 33 to a disk 10. In a similar manner, header 77 has a pair of pointers respectively represented by arrows 101 and 102 pointing to the linked control list and in turn to the object buffers of object chain 100. Each of the headers within doubly-linked list 72 can correspond to one of a plurality of optical recording devices collectively represented by device 32. For example, in a media library environment, four optical recording devices could be employed. In that case, four headers could comprise doubly-linked list 72, each header comprising a single write request for a plurality of data objects which are an integral multiple of the VTOC entry storing capacity of a VTOC sector on a respective disk 10. A practical embodiment will usually include a plurality of control task control blocks 70 each with similarly anchored linked list of chain headers 72 and with attached object chains, as shown. The host processor writes to disk 10 the information contained in the linked list associated with the object buffers sequence the transfer of data from the buffers into device 32, as is practiced with similar control blocks in day-to-day data processing operations that are well known. Upon completion of the recording operation, the location on disk 10 of the recorded data objects is known. At that time, the VTOC entry is generated by the recording program activated at step 48 using known techniques and recorded in portion 14 of disk 10. Upon completion of recording a data object on disk 10, its recorded location (disk name, sector numbers, etc.) on disk is inserted by the recording program into the OPL 85, 95 . . . for the data object. Host processor 25 accesses the OPL's 85, 95 . . . for updating catalog 27. After all of these "housekeeping" machine operations occur, the recorded data object is erased from buffer 33, then the chain structure is removed after all of the "housekeeping" for the chain is completed.

While the invention has been particularly shown and described with reference to preferred embodiments thereof, it will be understood by those skilled in the art that various changes in form and details may be made therein without departing from the spirit and scope of the invention.

What is claimed is:

1. In a machine-effected method of operating an information handling system which includes a host processor, a relatively rapid access data buffer element means and a large capacity relatively slower access record medium means;

including the machine-executed steps of:

automatically accumulating in said buffer element means a plurality of variably-sized data objects to eventually be stored on said record medium means;

for each of said accumulated objects, building a medium directory entry and storing same in said buffer element means;

establishing a maximum number of said directory entries storable in a single one of the addressable storage areas of said record medium means;

dividing the number of accumulated data objects by said maximum number and when the number of accumulated objects is equal to or an integral multiple of said maximum number, selected said maximum number of accumulated data objects and associated directory entries from said buffer element and transferring same to said record medium during a single access to said record medium means;

establishing an upper threshold of a maximum number of data bytes of said accumulated data objects to be stored in said buffer element means;

and whenever the total number of bytes in the accumulated data objects exceeds said upper threshold, activating said single access irrespective of whether or not the number of accumulated data objects is an integral multiple of said maximum number.

2. In the machine-effected method set forth in claim 1, further including the additional machine-executed steps of:

establishing a lower threshold of a minimum number of data bytes to be transferred during said single access; and accumulating said data objects in said buffer element means until said lower threshold is exceeded and the number of data objects is an integral multiple of said given number, then performing said single access.

3. In the machine-effected method set forth in claim 1, further including the machine-executed step of:

selecting said record medium means to include a write-once read-many record medium for receiving and storing said data objects and VTOC directory entries.

4. In apparatus of an information handling system, the combination of:

a host processor having a main memory and program indicia which are sensible by said host processor and to which the host processor responds to automatically perform machine operations indicated by said program indicia;

data object input means operatively coupled to said host processor for supplying variably-sized data objects to said host processor;

a relatively fast access buffer operatively coupled to said host processor for receiving data to be stored in the buffer and to supply such stored data to the host processor;

a relatively slow response recorder operatively coupled to the host processor and having a record medium which is capable of storing large amounts of data;

said program indicia including entry indicia for enabling the host processor to respond to received data objects and for building a VTOC directory entry for each of said received data objects;

buffer indicia for enabling said host processor to store said received data objects and its associated built VTOC directory entry into said buffer;

counter indicia for enabling the host processor to count the number of variably sized data objects stored in said fast access buffer and including indications of the total number of data bytes stored in the buffer;

sector indicia means indicating a predetermined number of said built VTOC directory entries storable in a given addressable storage area of the record medium in said slow response recorder;

divide indicia means for enabling said host processor to access said indicating indicia means and said count indicia means for dividing the count of said data objects stored in the buffer by said predetermined number, then for indicating the value of a remainder;

transfer initiation indicia means for enabling the host processor to compare the value of the remainder for determining its zero value; and single access data transfer indicia for enabling said host processor for responding to the remainder being zero for transferring an integral multiple of said predetermined number of data objects from said buffer to said slow response recorder in a single access set of data transfer operations.

5. The apparatus set forth in claim 4, further including further program indicia of:

lower threshold indicia for enabling said host processor to delay said single access means responding to said remainder equals zero until a total number of bytes of said accumulated data objects are stored in said buffer.

6. In the apparatus set forth in claim 4, further including:

upper threshold program indicia in said host processor for enabling the host processor to transfer said accumulated data objects from said buffer to said slow response recorder irrespective of the remainder value such that all VTOC directory entry receiving sectors but one have said predetermined number of VTOC directory entries stored therein.

7. In the apparatus set forth in claim 4, further including:

write-once, read-many record media in said slow response recorder and said media being in a disk form with said accumulated data objects being storable in a first radial portion of the disk record medium and said VTOC directory entries being storable in a second radial portion of said record medium.

8. In the apparatus set forth in claim 4, wherein said fast access buffer includes a fast access magnetic DASD and a portion of said main memory; and said buffer indicia for enabling said host processor to first store the received data objects into said DASD and later accumulate chains of copies of said stored data objects in said main memory and said single access data transfer indicia recording a chain of said data objects stored in said main memory during said single access.

* * * * *